United States Patent
Do Khac

(10) Patent No.: US 9,948,752 B2
(45) Date of Patent: Apr. 17, 2018

(54) DEFAULT DATA PACKET ROUTING IN A NFC DEVICE

(71) Applicant: STMicroelectronics International N.V., Amsterdam (NL)

(72) Inventor: Minh Tri Do Khac, La Gaude (FR)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 97 days.

(21) Appl. No.: 14/611,343

(22) Filed: Feb. 2, 2015

(65) Prior Publication Data

US 2016/0226767 A1 Aug. 4, 2016

(51) Int. Cl.
*H04L 29/06* (2006.01)
*H04W 4/00* (2018.01)
*H04L 12/781* (2013.01)
*H04L 12/725* (2013.01)
*H04L 12/741* (2013.01)

(52) U.S. Cl.
CPC .............. *H04L 69/22* (2013.01); *H04L 45/52* (2013.01); *H04W 4/008* (2013.01); *H04L 45/306* (2013.01); *H04L 45/74* (2013.01)

(58) Field of Classification Search
CPC ....... H04L 69/22; H04L 45/745; H04L 45/52; H04L 45/306; H04L 45/74; H04W 4/008
See application file for complete search history.

(56) References Cited

U.S. PATENT DOCUMENTS

| 7,493,412 B2 * | 2/2009 | Herkersdorf ............ H04L 45/00 370/351 |
| 2010/0227553 A1 | 9/2010 | Charrat et al. |
| 2013/0217323 A1 | 8/2013 | Bhatia et al. |

(Continued)

FOREIGN PATENT DOCUMENTS

WO WO-2014129812 A1 8/2014

OTHER PUBLICATIONS

NFC Forum, "NFC Controller Interface (NCI) Specification", NFCForum-TS-NCI-1.0, published Nov. 6, 2012, pp. 70-72.*

(Continued)

*Primary Examiner* — Luat Phung
*Assistant Examiner* — Thomas R Cairns
(74) *Attorney, Agent, or Firm* — Gardere Wynne Sewell LLP

(57) ABSTRACT

A method includes receiving a data packet transmitted by a near field communications (NFC) device at a NFC controller. Whether the data packet includes application identifier routing information is determined, and based thereupon the data packet is routed to a default application identifier routing address based on a look-up table lacking an application identifier routing address associated with the application identifier routing information. Whether the data packet includes protocol routing information is determined based upon the data packet lacking the application identifier routing information, and the data packet is routed to a default protocol routing address based upon the look-up table lacking a protocol routing address associated with the protocol routing information, using the NFC controller. The default application identifier routing address is different than the default protocol routing address.

15 Claims, 2 Drawing Sheets

(56) References Cited

U.S. PATENT DOCUMENTS

2015/0271677 A1    9/2015  Van Nieuwenhuyze et al.
2016/0026993 A1*   1/2016  Kang ................. G06Q 20/3227
                                                              705/39

OTHER PUBLICATIONS

Search Report and Written Opinion for co-pending DE Application No. 102015120352.9 dated Jul. 7, 2016.

* cited by examiner

DEFAULT DATA PACKET ROUTING IN A NFC DEVICE

TECHNICAL FIELD

This disclosure is related to the field of near field communication (NFC) and, more particularly, to the routing of data packets in an NFC enabled device.

BACKGROUND

Near field communication (NFC) is a set of standards for smartphones and similar devices utilized to establish radio communication between two devices by touching them together or bringing them into proximity, typically at a distance of 10 cm or less.

NFC uses electromagnetic induction between two loop antennas located within each other's near field, effectively forming an air-core transformer. It operates within globally available and unlicensed radio frequency bands, and at rates ranging from 106 kbit/s to 424 kbit/s. NFC involves an initiator and a target; the initiator actively generates an RF field that can power a passive target, an unpowered chip called a "tag". This enables NFC targets to take simple form factors such as stickers, key fobs, or cards that do not use batteries.

NFC tags store data (typically between 96 and 4,096 bytes) and may be read-only, but may alternatively be rewriteable. The tags can securely store personal data such as debit and credit card information, loyalty program data, personal identification numbers, and networking contacts, among other information. They can be custom-encoded by their manufacturers or use the specifications provided by the NFC Forum, an industry association.

In addition to communication between a powered NFC device and an unpowered NFC device, NFC peer-to-peer communication is possible, provided both devices are powered. This may be utilized for peer-to-peer data transfers, for example. In addition, an active NFC device may emulate an NFC card in what is called a card emulation mode.

When the receiving NFC device receives the data, it then routes the data to an appropriate destination within the NFC device, such as a non-volatile memory, or any component attached to the NFC device that can handle the received data. In order to properly route the data, the NFC device reads routing information from the data, or attributes of the data e.g., the protocol used to transport the data (for example: ISO14443 a.k.a. ISO-DEP, or NFC-DEP, etc.) or the NFC-RF technology used to transport the data over the air (e.g., RF Type A or RF Type B, etc.), that indicates what type of routing is to be used, then attempts to correlate the routing information with a routing address in a look-up table.

However, sometimes there is either not a routing address in the look-up table that is associated with the routing information, or the routing information itself is lacking. To address these situations, further development in the area of NFC data routing is desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method includes receiving a data packet transmitted by a near field communications (NFC) device that initiates the NFC communication at a NFC controller. Whether the data packet includes application identifier routing information is determined, and based thereupon the data packet is routed to a default application identifier routing address based on a look-up table lacking an application identifier routing address associated with the application identifier routing information. Whether the data packet includes protocol routing information is determined based upon the data packet lacking the application identifier routing information, and the data packet is routed to a default protocol routing address based upon the look-up table lacking a protocol routing address associated with the protocol routing information, using the NFC controller. The default application identifier routing address may be different than the default protocol routing address.

The default application identifier routing address and the default protocol routing address may be received from a device host, using the NFC controller.

The default application identifier routing address and the default protocol routing address may be stored in the look-up table.

Whether the data packet includes technology routing information may be determined based upon the data packet lacking the protocol routing information, and the data packet may be routed to a default technology routing address based upon the look-up table lacking a technology routing address associated with the technology routing information. The default technology routing address may be different than the default protocol routing address.

The default protocol routing address may be received from a device host, using the NFC controller.

The data packet may be routed to a default routing address based upon the data packet lacking technology routing information, using the NFC controller.

The default routing address may be received from a device host, using the NFC controller.

The default routing address may be stored in the look-up table.

Another aspect is directed to a method include receiving a data packet transmitted by a near field communications (NFC) device at a NFC controller. Whether the data packet includes first routing type information is determined, and based thereupon the data packet is routed to a default first routing address based on a look-up table lacking a first routing type routing address associated with the first routing type information, using the NFC controller. Whether the data packet includes second routing type information is determined based upon the data packet lacking the first routing type information, and the data packet is routed to a default second routing address based upon the look-up table lacking a second routing type routing address associated with the second routing type information, using the NFC controller. The first default routing address is different than the second default routing address.

A further aspect is directed to electronic device including a device host, a plurality of devices, and a near field communications (NFC) controller coupled to the device host and the plurality of devices. The NFC controller is configured to receive a data packet transmitted by an external NFC device. The NFC controller is also configured to determine whether the data packet includes application identifier routing information, and based thereupon route the data packet to a default application identifier routing address based on a look-up table lacking an application identifier routing address associated with the application identifier routing information. The NFC controller is further configured to determine whether the data packet includes protocol routing information based upon the data packet lacking the application identifier routing information, and route the data packet to a default protocol routing address based upon the look-up table lacking a protocol routing address associated with the protocol routing information. The default application identifier routing address is different than the default protocol routing address.

DETAILED DESCRIPTION

Figure 1:
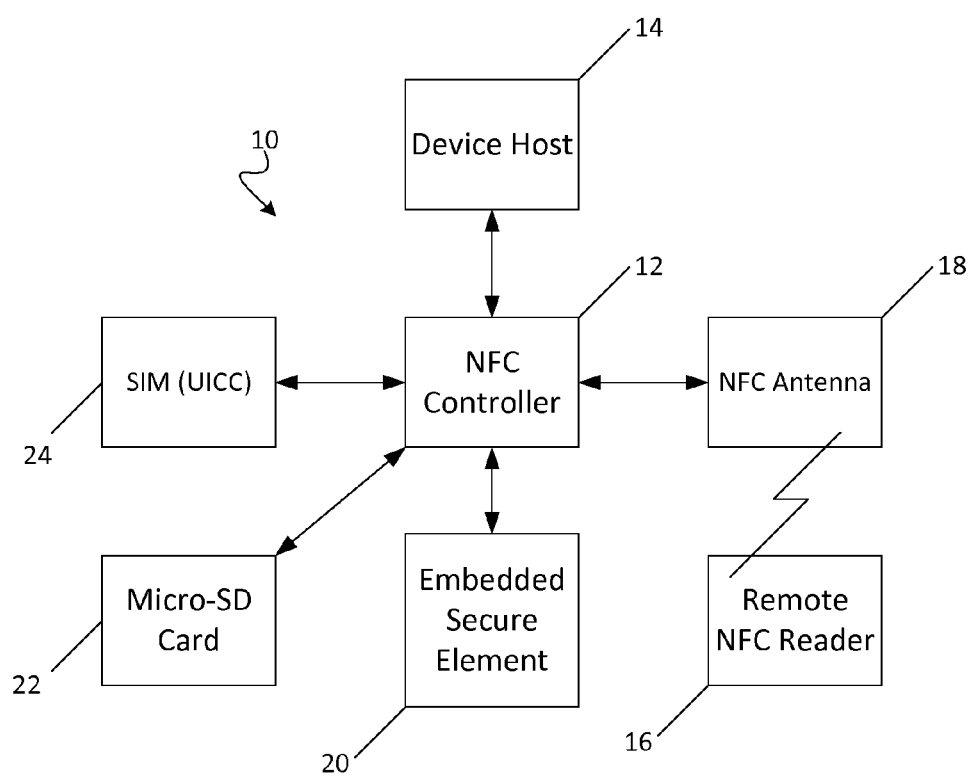
FIG. 1 is a schematic block diagram of a NFC system on which the methods and routing techniques of this disclosure can be applied.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

With initial reference to FIG. 1, an electronic device 10 is now described. The electronic device 10 may be any NFC enabled device, such as a smartphone, tablet, or smartwatch. The electronic device 10 includes a central processor, referred to here as a device host 14, which may be a system on chip. The device host 14 is coupled to a NFC controller 12, which may act as a universal asynchronous receiver/transmitter (UART), inter-integrated circuit, or other suitable bus for NFC communications, an optional embedded secure element 20 which provides a secure memory and execution environment for security conscious transactions such as financial transactions, and a NFC antenna 18 by which the device host 14 transmits or receives data via NFC. The NFC controller 12 are also coupled to an optional micro-sd card 22 which provides non-volatile storage, as well as to an optional subscriber information module (SIM) 24 which may also provide non-volatile storage. Additional non-volatile storage components also coupled to the NFC controller 12 may also be present in some applications.

As shown, the NFC controller 12 is illustratively communicating with an external NFC device 16, such as a payment terminal, thereby also facilitating communications between the SIM 24, Micro-SD card 22, and secure element 20 and the payment terminal. The remote NFC reader 16 sends data packets, such as data packets containing commands, to the NFC controller 12 via communication between its antenna (not shown) and the NFC antenna 18.

The electronic device 10 may be operating in the card emulation mode, in which the NFC controller 12 simulates the behavior of an NFC card, such as an ISO-14443 smartcard. This allows the electronic device 10 to substitute for a NFC card used in traditional security applications such credit card payments, identification badging, etc. When operating in the card emulation mode, the electronic device 10 receives the command containing data packets from an application executing on the external NFC device 16. The data packets may contain application identifiers (AID) that are associated with the application executing on the external NFC device 16, or with an application a command in the data packet is ordering the electronic device 10 to executive.

Figure 2:
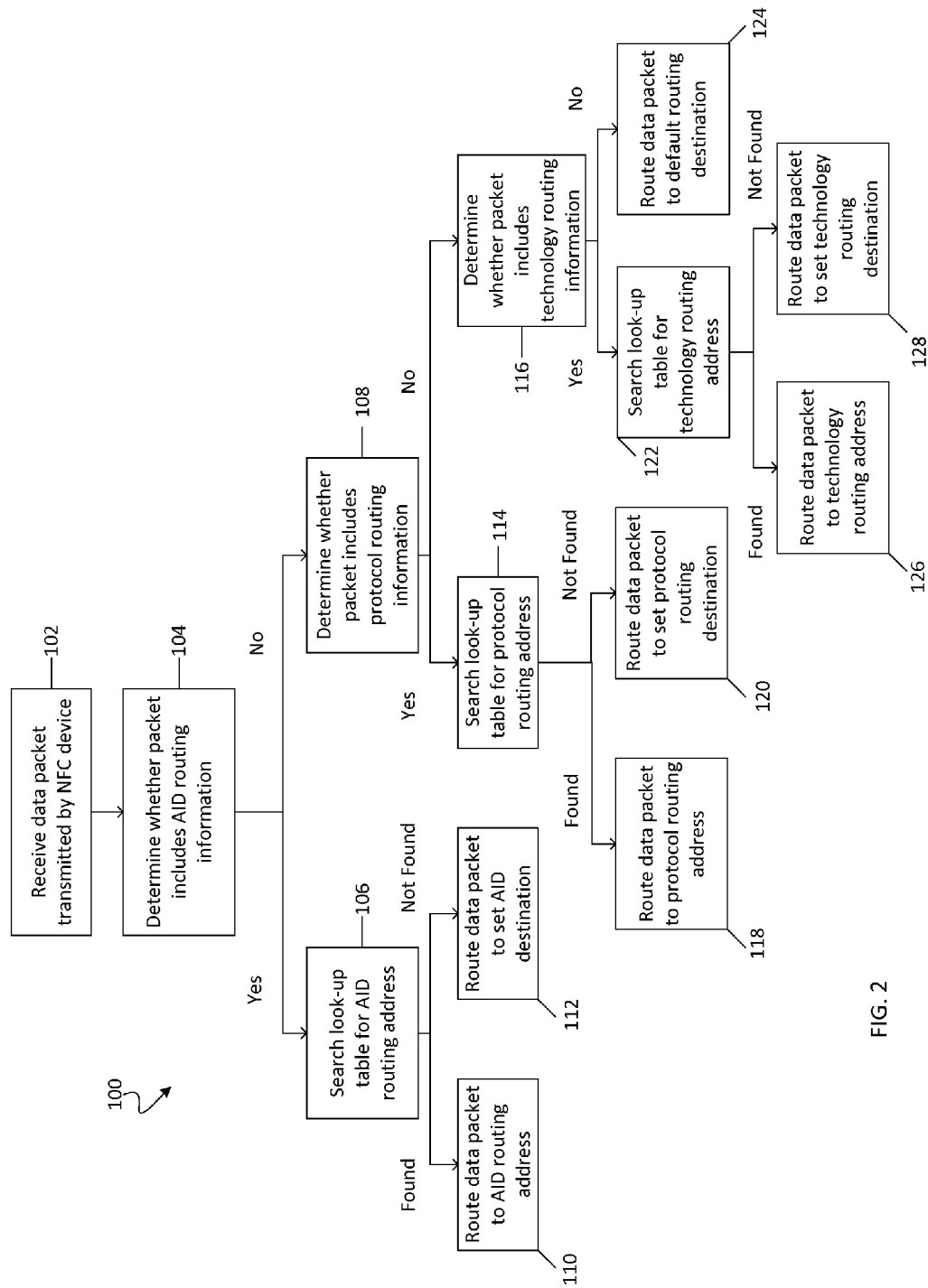
FIG. 2 is a flowchart of a method of routing data packets according to this disclosure.

The NFC controller 12 passes the data packets to their destination (i.e., the SIM 24, micro SD card 22, secure element 20, or device host 14), based upon the AID. Routing of the data packets will now be described with additional reference to the flowchart 100 of FIG. 2. The NFC controller 12 receives a data packet transmitted by the remote NFC reader 16 (Step 102).

As will be understood by those of skill in the art, there are three different types of NFC routing that can be performed: application ID (AID) routing (as described above), protocol based routing (i.e., based upon the specific NFC protocol being used), and technology based routing (i.e., based upon the specific NFC system being used). AID routing is the most common type of routing for active NFC devices and NFC devices operating in the card emulation mode, and is preferable because it can be customized for the applications whose execution resulted in the data in a data packet. Therefore, the NFC controller 12 examines each packet to first determine whether that packet includes AID routing information (Step 104).

If the AID routing information is found in the packet, the NFC controller 12 then searches a look-up table (received from the device host 14) for an AID routing address associated with that AID routing information (Step 106). The entries in the look-up table contain fields for the routing type, length of a value, the value itself (with the value being the AID, for example, in the case where AID routing is used), and the routing address associated with the value. When the NFC controller 12 searches the look-up table for the AID routing address, it searches the look-up table for the AID routing information (i.e. searches the value fields of the AID routing entries), and then returns the routing address corresponding to the AID routing entry.

If the AID routing address is found in the look-up table, the NFC controller 12 then routes the data packet accordingly (Step 110), such as to the secure element 20, micro-sd card 22, SIM 24, or device host 14. If, however, the AID routing address is not found, the NFC controller 12 may then route the data packet to a set default AID destination (Step 112). This set default AID destination may have been previously sent by the device host 14, and stored in the look-up table. By routing data packets with AID routing information, yet which do not have a corresponding entry in the look-up table, to the set default AID destination, memory can be saved, as the look-up table need not have AID routing addresses for AID routing data associated with data packets which are to be routed to set default AID destination. In addition to saving memory from using fewer entries in the look-up table, the processing time used to look up addresses in the look-up table is reduced, as the look-up table can have fewer entries.

If the AID routing information was not found at Step 104, then the NFC controller 12 determines whether the packet includes protocol routing information (Step 108). If the packet does indeed include protocol routing information, then the NFC controller 12 searches the look-up table for a protocol routing address (Step 114).

When the NFC controller 12 searches the look-up table for the protocol routing address, it searches the look-up table for the protocol routing information (i.e., searches the value fields of the protocol routing entries), and then returns the routing address corresponding to the protocol routing entry.

If the protocol routing address is found, the NFC controller 12 sends the packet to the protocol routing address (Step 118). If the protocol routing address is not found, then the NFC controller 12 may route the packet to a set protocol routing address (Step 120). This set default protocol routing address may have been previously sent by the device host 14.

If the NFC controller 12 was unable to find the protocol routing information, or if there is no default protocol routing address associated with the protocol routing information, it then determines whether the packet includes technology routing information (Step 116). If the packet includes the technology routing information, the NFC controller 12 then searches the look-up table for a technology routing address associated with the technology routing information (Step 122).

When the NFC controller 12 searches the look-up table for the technology routing address, it searches the look-up table for the technology routing information (i.e., searches the value fields of the technology routing entries), and then returns the routing address corresponding to the technology routing entry.

If the technology routing address is found, then the NFC controller 112 routes the packet to the technology routing address (Step 126). If the technology routing address was not found, then the NFC controller 112 routes the packet to a set technology routing destination (Step 128). This set default technology routing address may have been previously sent by the device host 14.

If even the technology routing information was not found at Step 116, then the NFC controller 12 may route the data packet to a default routing destination (124). This set default routing destination may have been previously sent by the device host 14.

The set default AID routing address, the set default protocol routing address, the set default technology routing address, and the set default routing destination may, as stated above, be sent by the device host 14. This address can be contained within the look-up table.

In the case where the set default AID routing address, the set default protocol routing address, the set default technology routing address, and the set default routing destination are stored in the look-up table, the value field can be set to a default value not otherwise used to indicate that the particular entry is one of the default routing addresses.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
   receiving a data packet transmitted by a near field communications (NFC) device at a NFC controller, the data packet potentially containing routing information;
   wherein, if the data packet contains routing information, the routing information consists of at least one of application identifier routing information, protocol routing information, and technology routing information;
   determining whether the data packet includes application identifier routing information, and based thereupon routing the data packet to a default application identifier routing address based on a look-up table lacking an application identifier routing address associated with the application identifier routing information, using the NFC controller;
   determining whether the data packet includes protocol routing information based upon the data packet lacking the application identifier routing information, and routing the data packet to a default protocol routing address based upon the look-up table lacking a protocol routing address associated with the protocol routing information, using the NFC controller;
   wherein the default application identifier routing address is different than the default protocol routing address;
   determining whether the data packet includes technology routing information based upon the data packet lacking the protocol routing information, and routing the data packet to a default technology routing address based upon the look-up table lacking a technology routing address associated with the technology routing information, using the NFC controller;
   where the data packet does not include application identifier routing information, protocol routing information, and technology routing information, routing the data packet to a default address, using the NFC controller;
   wherein the default technology routing address is different than the default protocol routing address; and
   wherein the default address is different than the default technology routing address, the default protocol routing address, and the default application identifier routing address.

2. The method of claim 1, further comprising receiving the default application identifier routing address and the default protocol routing address from a device host, using the NFC controller.

3. The method of claim 2, further comprising storing the default application identifier routing address and the default protocol routing address in the look-up table.

4. The method of claim 1, further comprising receiving the default protocol routing address from a device host, using the NFC controller.

5. The method of claim 4, further comprising storing the default protocol routing address in the look-up table.

6. The method of claim 1, further comprising receiving the default routing address from a device host, using the NFC controller.

7. The method of claim 6, further comprising storing the default routing address in the look-up table.

8. A method, comprising:
   receiving a data packet transmitted by a near field communications (NFC) device at a NFC controller, the data packet potentially containing routing information;
   wherein, if the data packet contains routing information, the routing information consists of at least one of first routing type information, second routing type information, and third routing type information;

determining whether the data packet includes first routing type information, and based thereupon routing the data packet to a first default routing address based on a look-up table lacking a first routing type routing address associated with the first routing type information, using the NFC controller; and determining whether the data packet includes second routing type information based upon the data packet lacking the first routing type information, and routing the data packet to a second default routing address based upon the look-up table lacking a second routing type routing address associated with the second routing type information, using the NFC controller;

determining whether the data packet includes third routing type information based upon the data packet lacking the second routing type information, and routing the data packet to a third default routing address based upon the look-up table lacking a third routing type routing address associated with the third routing type information, using the NFC controller;

routing the data packet to a fourth default routing address based upon the look-up table lacking the first, second, and third routing type information;

wherein the first default routing address is different than the second default routing address;

wherein the third default routing address is different than the second default routing address; and wherein the fourth default routing address is different than the first, second, and third default routing addresses.

9. The method of claim 8, further comprising receiving the first default routing address and the second default routing address from a device host, using the NFC controller, and storing the first default routing address and the second default routing address in the look-up table.

10. The method of claim 8, further comprising receiving the third default routing address from a device host, using the NFC controller, and storing the third default routing address in the look-up table.

11. An electronic device, comprising:
a device host;
a plurality of devices;
a near field communications (NFC) controller coupled to the device host and the plurality of devices, the NFC controller configured to:
    receive a data packet transmitted by an external NFC device, the data packet potentially containing routing information;
    wherein, if the data packet contains routing information, the routing information consists of at least one of application identifier routing information, protocol routing information, and technology routing information;
    determine whether the data packet includes application identifier routing information, and based thereupon routing the data packet to a default application identifier routing address based on a look-up table lacking an application identifier routing address associated with the application identifier routing information,
    determine whether the data packet includes protocol routing information based upon the data packet lacking the application identifier routing information, and routing the data packet to a default protocol routing address based upon the look-up table lacking a protocol routing address associated with the protocol routing information,
    determine whether the data packet includes technology routing information based upon the data packet lacking the protocol routing information, and route the data packet to a default technology routing address based upon the look-up table lacking a technology routing address associated with the technology routing information, and
    where the data packet does not include application identifier routing information, protocol routing information, and technology routing information, route the data packet to a default address,
wherein the default technology routing address is different than the default protocol routing address,
wherein the default address is different than the default technology routing address, the default protocol routing address, and the default application identifier routing address,
wherein the default application identifier routing address is different than the default protocol routing address.

12. The electronic device of claim 11, wherein the device host is configured to send the default application identifier routing address and the default protocol routing address to the NFC controller.

13. The electronic device of claim 12, wherein the device host is configured to store the default application identifier routing address and the default protocol routing address in the look-up table, and to send the look-up table to the NFC controller.

14. The electronic device of claim 11, wherein the device host is configured to send the default protocol routing address to the NFC controller.

15. The electronic device of claim 14, wherein the device host is configured to store the default protocol routing address in the look-up table and to send the look-up table to the NFC controller.

* * * * *